(12) United States Patent
Giacomini (10) Patent No.: US 8,944,404 B2
(45) Date of Patent: Feb. 3, 2015

(54) GAS SAFETY VALVE

(75) Inventor: Corrado Giacomini, Orta S. Giulio (IT)

(73) Assignee: Giacomini S.p.A., San Maurizio d'Opaglio (NO) (IT)

( * ) Notice: Subject to any disclaimer, the term of this patent is extended or adjusted under 35 U.S.C. 154(b) by 38 days.

(21) Appl. No.: 13/417,455

(22) Filed: Mar. 12, 2012

(65) Prior Publication Data

US 2013/0234056 A1    Sep. 12, 2013

(51) Int. Cl.
*F16K 35/10*    (2006.01)

(52) U.S. Cl.
USPC .......................... 251/96; 251/95; 251/315.01

(58) Field of Classification Search
USPC ........................................ 251/95, 96, 315.01
See application file for complete search history.

(56) References Cited

U.S. PATENT DOCUMENTS

| | | | | |
|---|---|---|---|---|
| 1,801,175 A | * | 4/1931 | Possons | 251/96 |
| 2,823,886 A | * | 2/1958 | Jakeway et al. | 251/104 |
| 3,193,243 A | * | 7/1965 | Billington et al. | 251/96 |
| 4,078,763 A | | 3/1978 | Yamamoto | |
| 4,714,236 A | | 12/1987 | Filiberti | |
| 5,090,447 A | * | 2/1992 | Lewis et al. | 137/559 |
| 5,188,335 A | * | 2/1993 | Pettinaroli | 251/95 |
| 6,260,819 B1 | * | 7/2001 | Ovsepyan | 251/96 |
| 7,178,781 B2 | | 2/2007 | Trappa | |
| 8,132,784 B2 | * | 3/2012 | Ferrero | 251/214 |
| 8,424,837 B2 | * | 4/2013 | Bugatti | 251/96 |

FOREIGN PATENT DOCUMENTS

| | | |
|---|---|---|
| CH | 204946 A | 5/1939 |
| DE | 19847039 C1 | 7/2000 |
| WO | 2007072534 A2 | 6/2007 |

OTHER PUBLICATIONS

Written Opinion, dated Sep. 10, 2013, from corresponding PCT application.

* cited by examiner

*Primary Examiner* — John K Fristoe, Jr.
*Assistant Examiner* — Daphne M Barry
(74) *Attorney, Agent, or Firm* — Young & Thompson (57) ABSTRACT

A gas safety valve (1) capable of avoiding unwanted or inadvertent opening and possible closing, with maximum safety and allowing an opening, and possible closing, of these safety valves only through a double intentional and reliable maneuver includes a knob (22) for controlling the shutter (7) of the valve (1), during the opening and closing rotation movement, stop projections (32, 33) of the valve (1) slide on sliding segments (37, 38; 37B, 38B) provided in the knob (22) coplanar or flat-like inclined and associated to relative positioning projections (41, 42), a spring (28) housed in a chamber between a threaded end (19) of a screw (11), and a chamber (23) of the knob (22).

14 Claims, 5 Drawing Sheets

GAS SAFETY VALVE

FIELD OF APPLICATION

The present invention refers to a gas safety valve, according to the preamble of claim 1.

TECHNOLOGICAL BACKGROUND AND STATE OF THE ART

Gas safety valves are usually used in gas distribution systems to safely avoid gas leakage, and possible ensuing damage, in case of incorrect handling.

Such safety valves have a ball shutter and a control rotation member in form of a knob with one or two gripping fins, or a lever or the like, where solely the representative term of a knob will be used hereinafter for the sake of simplicity. Such knobs are generally rotatable for a ninety-degree rotation to rotate the ball shutter from the opening position to the closing position and vice versa.

Gas safety valves are known in different embodiments, which provide for a control with a double manoeuvre, as required for example in the United States for the so-called latching-type valves.

A valve of this type is disclosed, for example, in documents IT-A-1.346.153 and U.S. Pat. No. 7,178,781 B2 on behalf of the Italian company Valvosanitaria Bugatti S.p.A.

These known valves have the common characteristic of requiring various additional components with respect to the conventional valves and provide for a double control manoeuvre comprising, starting from the valve in closed position, a first axial movement of lowering the knob countering a spring and the subsequent rotation of the knob by 90° to take the knob/shutter to the opening position.

It is clear that, considering the brief rotation for opening the valve by 90°, the only guarantee of safety against inadvertent opening is provided by the compression pressing on the knob, which actually may also be caused inadvertently for various reasons both by the installers, users, other people or household animals. In a known case of opening a safety valve of this type was actually caused by a dog which lay on the knob pressing it with its weight and then rotating it by rubbing it with the movement thereof.

Furthermore, such known safety valves are not capable of equally providing a safety of a shutter in opening position, as required at times, hence they cannot exclude inadvertent partial or full closing movements of the valve.

SUMMARY OF THE INVENTION

The present invention proposes to provide a gas safety valve capable of avoiding unwanted or inadvertent opening and possible closing, with maximum safety and allowing an opening, and possible closing, of these safety valves only through a double intentional and reliable manoeuvre.

This task is obtained, according to the invention, by means of a gas safety valve having the characteristics of claim 1.

Further developments of the proposed gas safety valve are observable from the characteristics described in the dependent claims.

The gas safety valves according to the invention allow attaining various and considerable advantages.

First and foremost a compression or force action on the knob does not cause any movement thereof, even in case of pressure with considerable force. Another advantage lies in the fact that with respect to the conventional ball valves the disclosure of the present invention solely requires limited modifications of the knob and of the screw connecting said knob with the ball shutter, while such modifications of the knob can be obtained directly through the casting of the knob, both made of metal and synthetic material, hence, besides the need for a new casting, there are no additional costs and, regarding the screw there is only required a considerable extension of the upper threaded end thereof, hence the increase of the production costs is entirely negligible. Only one additional component made of a simple conventional spring is provided for.

The removable positioning means and the means for fastening the screw into the neck of the body valve remain entirely unvaried, given that the body may be provided in any embodiment at will, as illustrated for example in the U.S. Pat. No. 4,714,236 A.

A further advantage lies in the fact that locking the spring in the housing chamber thereof does not require additional components, given that the head of the same screw provided previously for locking the knob onto the screw is used.

The disclosure of the present invention can be applied onto any embodiment of the knob, or control member, where on the knob there can be preferably advantageously provided a gripping projection safely facilitating the first movement of the double opening, and possibly closing, manoeuvre, or a brief axial lifting movement.

Furthermore, there should be observed a further advantage according to which the valves according to the invention in the opening position thereof are not locked in any manner whatsoever, hence the closing manoeuvre thereof may be performed any time in a simple manner and with maximum speed, such solution representing a very important advantage in terms of safety. According to the invention, with the valve open the spring may remain, depending on the embodiment, compressed or released.

Furthermore, according to the invention there is advantageously provided an embodiment requiring the knob to be lifted to pass from the open position to the closed position and vice versa as required in various fields of application wherein there is required the safe lifting of the knob also to pass from the opening position to the closing position.

A further advantage lies in the fact that the mechanical lock is guaranteed by a particular configuration directly provided for within the knob and which allows the elastically preloaded housing of the two stop projections formed on the neck of the valve body.

BRIEF DESCRIPTION OF THE DRAWINGS

Further characteristics advantages and details of the gas safety valve according to the invention, as well as of the implementation thereof, will be clearer from the following description of some preferred embodiments of such gas safety valves illustrated purely by way of non-limiting example in the attached drawings, wherein:

FIG. 12 is a bottom perspective view of a second embodiment of the control knob, FIGS. 13 and 14 each show a sectional bottom view analogous to FIGS. 8 and 11 with shutter, or knob, respectively in the opening and closing position, FIG. 15 is a bottom perspective view of a variant of the knob of FIG. 2, and FIGS. 16, 17 and 18 each show a perspective view of the knobs having handgrip portions to guarantee a firm gripping of the knobs facilitating the lifting movement thereof.

DESCRIPTION OF THE PREFERRED EMBODIMENTS

In various figures identical parts have identical reference numbers.

Figure 1:
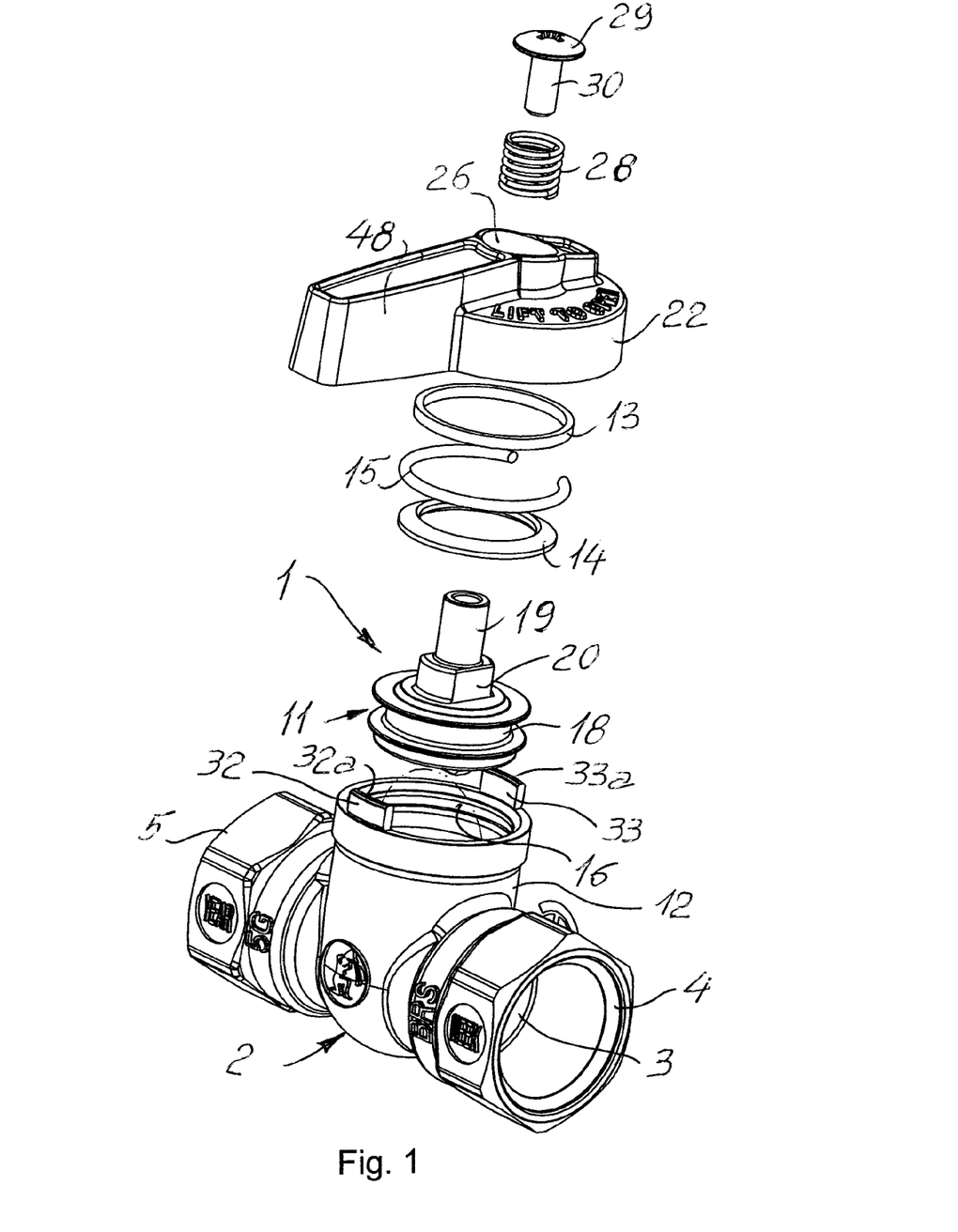
FIG. 1 is an exploded view of a gas safety valve according to the invention.
Figure 6:
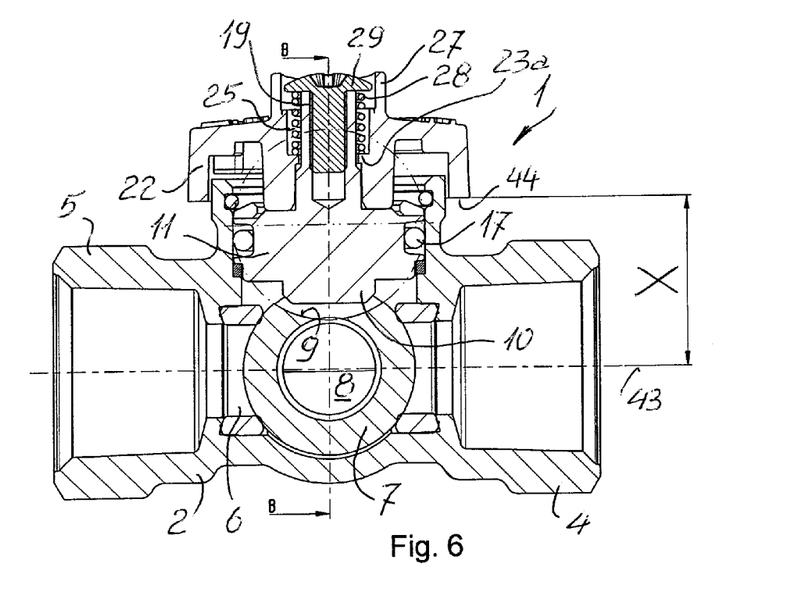
FIG. 6 is a median longitudinal section according to plane A-A in FIG. 7 through the assembled valve of FIG. 1 in the closed position.

First, reference is made to FIG. 1, in which a gas safety valve according to the invention is indicated in its entirety with 1 and it has a valve body 2 having a through conduit 3 with an inlet 4 and an outlet 5, or vice versa, same case applying to an intermediate chamber 6, FIG. 6, in which there is rotatably and sealingly housed a ball shutter 7 with a through hole 8. The ball shutter 7 has—at the upper part—a seat 9, for example a fissure, in which the lower end 10, for example in form of a tang, of a control screw 11 is engaged. This screw 11 is rotatably sealingly housed and axially not displaceable in a portion of neck 12 of the valve body 2. For such purpose there are provided removable positioning means formed, in the illustrated example, by a sealing ring 13, by a metal ring 14 flared at the top part and by an elastic metal ring 15 provided with slots which can be housed in a groove 16 formed in the neck 12 of the valve 1. A sealing O-ring housed in a groove 18 made in the screw 11 is indicated with 17. The screw 11 has—at the upper part—a threaded end 19 in which, in the known valves, there can be screwed a screw which traverses a hole provided in a control knob to lock said knob on the screw. The required 90 degree rotation movement to move the shutter 7 from the closing position to the opening position, and vice versa, is determined by a pair of stop projections provided on the neck and by a pair of positioning projections provided on the knob, as per se known in various implementations, for example in the U.S. Pat. No. 4,714,236 A.

At the upper part of the screw 11 there is a profiled enlargement 20 which can be housed in a corresponding profiled hole 21 provided in the control knob 22.

The present invention according to whose disclosure for the double manoeuvre of axial lifting and rotation of the knob to pass the ball shutter from the opening position to the closing position and vice versa, intervenes at this point, substantially maintaining the known embodiments of the ball valves unvaried and providing few and simple modifications solely concerning the upper end of the screw and of the knob, as well as the use of a simple spring and a different use of the known knob-screw stop screw.

Regarding the knob 22 it has a known through hole (23b) in form of a first circular seat 23 having a bottom 23a and defining with the upper threaded end 19 of the screw 11 an annular chamber 25, FIG. 6, whose circular seat 23 terminates—at the upper part—with a enlargement 26 defined by a collar 27. The annular chamber 25 houses a spring 28, one of whose ends rests on the bottom 23a of the circular seat 23 and whose other end rests on the lower side of the head 29 of the screw housed in the threaded hole of the upper end 19 of the screw 11. Thus, the knob 22 may be slightly lifted axially by traction from the screw 11 countering the elastic force of the spring 28.

Regarding the body 2 of the valve, the two stop projections of the rotation movement of the shutter 7 are provided in the known manner in form of two fins 32, 33 projecting upwards from the upper edge of the neck 12 and correspondingly rounded, whose upper side 32a and 33a, preferably smoothened or rounded at the corners, now constitutes a sliding side, as illustrated hereinafter.

Figure 2:
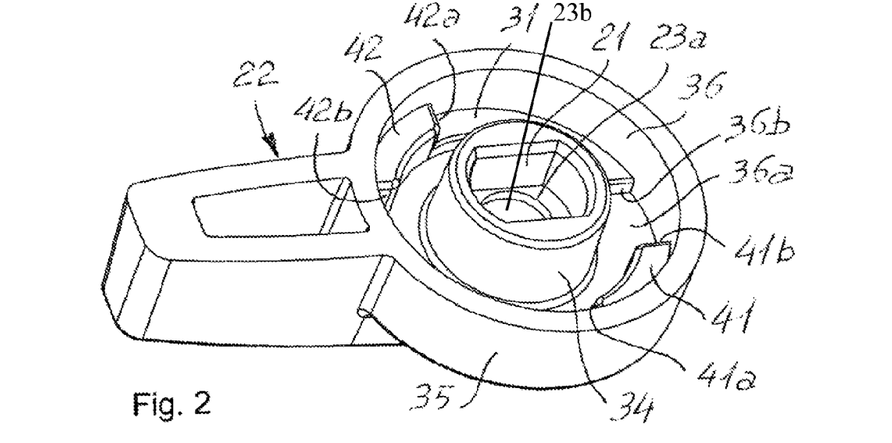
FIG. 2 is a bottom perspective view of the control knob.

As observable in particular from FIGS. 2-5, within the knob 22 the profiled seat 21 housing the profiled enlargement 20 of the screw 11 is obtained within a crown 34, which forms—with the outer wall 35 of the knob 22—an annular chamber 36 with a bottom or roof 36a. On this bottom 36a there are formed two opposite circular segments 37, 38, which, with respect to the bottom 36a, have a sliding plane 31, whose planes 31 in FIG. 2 are coplanar and form a step 36b with respect to the said bottom 36a.

Figures 3, 4, 5:
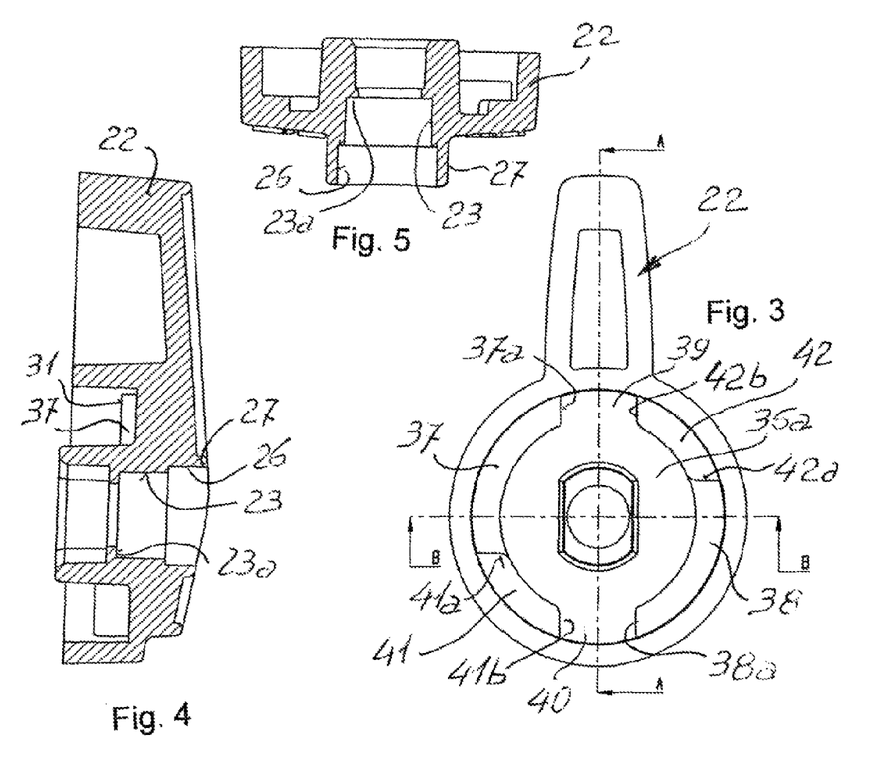
FIG. 3 is a bottom view of the knob of FIG. 2.
FIG. 4 is a sectional view according to plane A-A in FIG. 3.
FIG. 5 is a sectional view according to plane B-B in FIG. 3.

As observable in FIGS. 2 and 3, at the other end of the said circular segments 37 and 38 in the knob 22 there is respectively formed a positioning projection 41 and 42 with an inner abutment side 41a and 42a and an end 41b and 42b, whose ends 42b and 41b alongside the respectively opposite sides 37a and 38a form two opposite seats 39 and 40, into which the projections 32 and 33 enter when the knob 22 and the shutter 7 are at closing position.

Figures 7, 8:
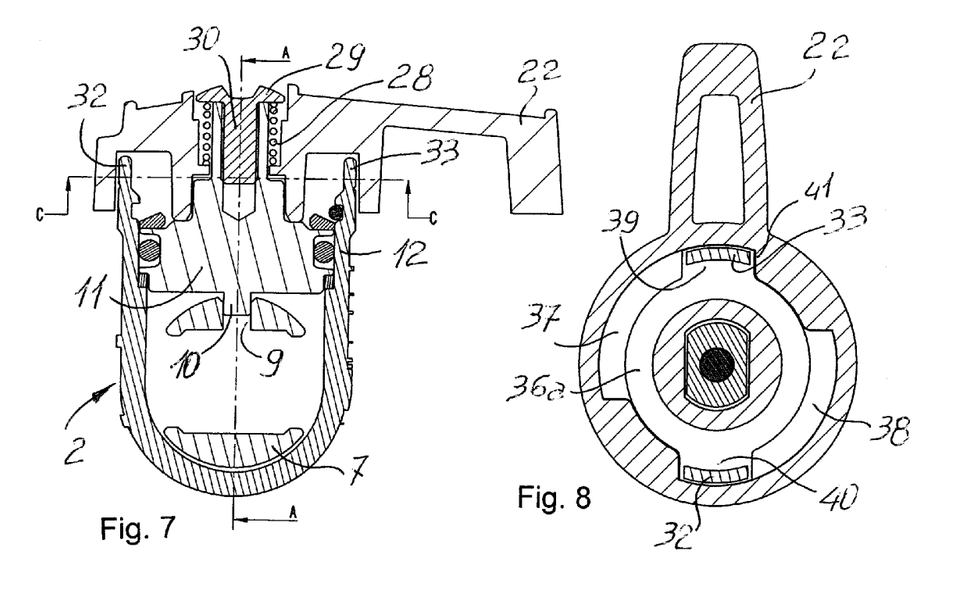
FIG. 7 is a median cross-section according to plane B-B in FIG. 6.
FIG. 8 is a bottom view of the knob in the section according to plane C-C of FIG. 7.
Figure 9:
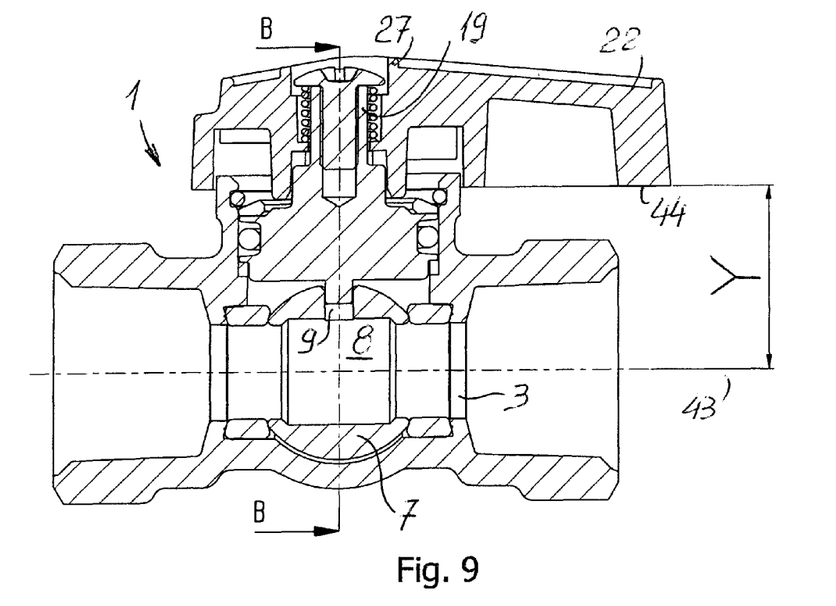
FIG. 9 is a median longitudinal section according to plane A-A in FIG. 10 through the assembled valve of FIG. 1 in the open position.
Figure 10:
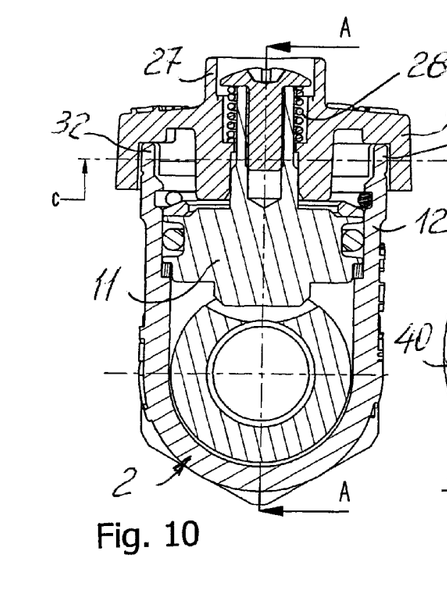
FIG. 10 is a median cross-section according to plane B-B in FIG. 9.
Figure 11:
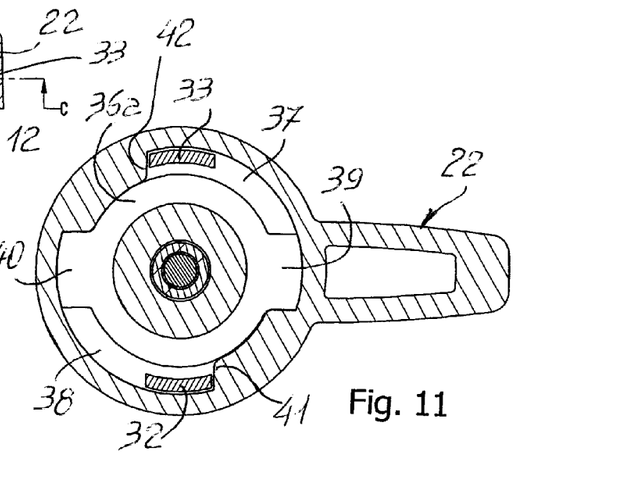
FIG. 11 is a bottom view of the knob in the section according to plane C-C of FIG. 10.

This first embodiment of the gas safety valve 1 according to the previously described embodiment operates as follows:

when the valve 1 is at the closing position, FIGS. 6-8, the projections 32, 33 on the neck 12 of the valve are housed in the seats 39, 40 of the knob 22, which is pushed downwards by the spring 28, and the step or thickness of circular segments 37, 38 prevents the rotation movement of the knob 22 both clockwise and anticlockwise. The distance between the longitudinal axis 43 of the valve and the lower side 44 of the knob 22 is indicated with X when the valve 1 is closed, FIG. 6, and with Y when the valve is open, FIG. 9, where Y>X by a degree slightly greater than the step or thickness of the circular segments 37 and 38.

The valve 1 is opened by gripping the knob 22 and lifting it axially upwards by a degree such to allow the upper or sliding sides 32a and 33a of the projections 32 and 33 to be beneath the coplanar plane 31 of the two circular segments 37 and 38, hence allowing a 90° rotation of the knob 22 in the opening direction delimited by the inner abutment sides of the positioning projections 41 and 42, where rotation in the opposite direction is hindered by the ends 41b and 42b of the abutment projections 41 and 42. Thus, lifting the knob 22 allows a 90° opening rotation of the knob 22, wherein in this rotation movement the upper sides 32a and 33a of the projections 32 and 33 will slide beneath the sliding circular segments 37, 38. At the end of the opening rotation, the knob 22 is released and the projections 32, 33 rest with the upper sides 32a and 33a thereof on the circular segments 37 and 38 maintaining the knob 22 at a lifted position, with the spring 28 compressed.

The valve is closed by simply rotating the knob 22 clockwise, where the projections 32 and 33 slide with the upper sides 32a and 33a thereof on the flat circular segments 37 and 38 until, at the end of the 90° closing rotation, said projections 32, 33 are beneath the seats 39 and 40 until the spring 28 pushes on said projections 32 and 33 with an expansion action and with an automatic lowering of the knob 22 in the closing position thereof, FIG. 6. It should be observed that in this embodiment the closing rotation movement may be performed in an extremely quick manner and without any jamming, this being a very important aspect in various cases of use specifically for a safe and quick closure of the valve.

Figures 12, 13, 14, 15, 16, 17, 18:
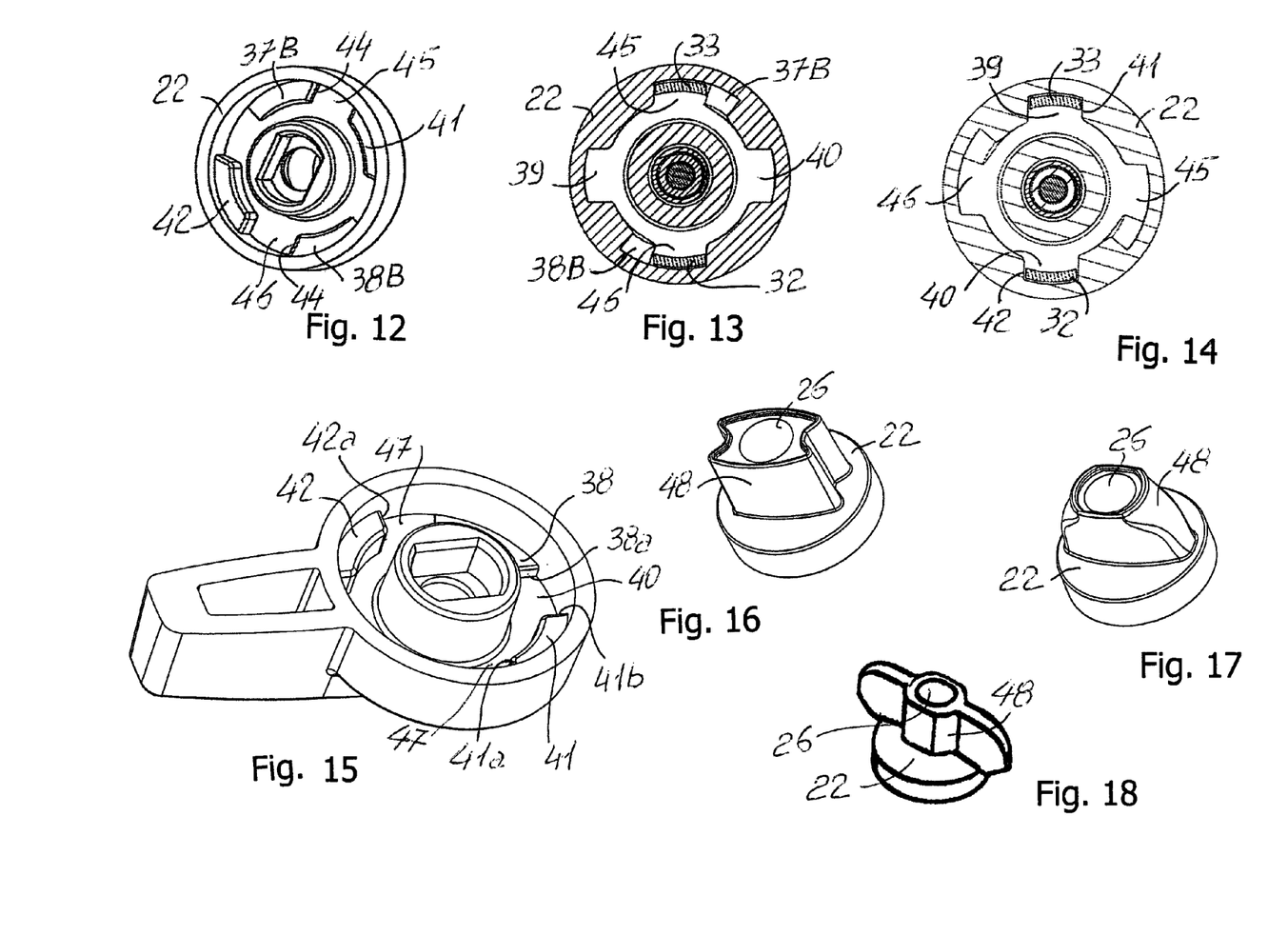

Alternatively, according to the invention, in order to prevent the spring 28 form remaining constantly compressed in the position of closing the valve 1 it is proposed to configure the circular segments 37, 38 in form of inclined wedge-like planes 37B and 38B, FIG. 12, with inclination increasing from the opening position towards the closing position where they terminate forming a step 44, which in turn forms with the adjacent end of the positioning projection 41, 42 a seat 45, 46 for respectively housing one of the two stop projections 32, 33 of the neck 12, as illustrated in FIG. 12, or like in FIG. 13 with the knob 22 at the open position and—in FIG. 14—at the closed position, wherein the stop projections 32 and 33 remain on the bottom 36a. Also in this case, the closing rotation movement may occur in a quickly and immediate manner.

According to a third embodiment of the valve 1, FIG. 15, in the knob 22 said two sliding circular segments 37, 38 coplanar, as illustrated in FIG. 15, or wedge-shaped, provide for the reduction of the thickness thereof up to the said bottom 36a of a section 47 of the end thereof near the adjacent to the positioning projection 41, 42 of the knob 22 so as to create a respective seat 47 for housing the said stop projections 32 and 33 of the valve 1 with shutter/knob reaching the opening position, where in this case also the beginning of the closing movement requires a preliminary lifting of the knob.

In order to guarantee safe gripping of the knob 22 and lifting thereof countering the spring 28 the knob may advantageously have suitable gripping portions 48 as illustrated for example in FIGS. 1, 16, 17 and 18.

From the structural and functional description of the gas safety valves according to the invention it is observed that the disclosures of the invention allow efficiently meeting the proposed object and attaining the previously mentioned advantages.

In practice, those skilled in the art may introduce various modifications or variants, such as for example provide for the projections on the neck of the valve and the abutment projections of the knob respectively outside the neck and knob, or provide for other configurations of the screw and/or the removable positioning means thereof and so on and so forth, without departing from the scope of protection of the present invention as defined in the claims that follow.

The invention claimed is:
1. A gas safety valve, comprising:
a valve body having a through conduit with an inlet and an outlet, and an intermediate chamber located between the inlet and the outlet for sealing a ball shutter,
the ball shutter having a through hole and an upper seat adapted to house the lower end of a control screw,
wherein the control screw is positioned rotatable and axially not displaceable in a neck of the valve body,
wherein the control screw has a threaded end with a profiled enlargement,
a control knob having a profiled seat surrounded by a first annular chamber, the profiled seat housing, with geometric coupling, the profiled enlargement of the control screw, the profiled seat having a through hole though which an upper threaded end of the control screw is inserted,
said control knob being provided with two positioning projections extending from a bottom of the first annular chamber and being equally opposite from each other,
wherein the neck of the valve body comprises two diametrically opposite stop projections adapted to cooperate with the two positioning projections equally opposite and provided in said control knob, wherein,
i) in said control knob there is provided a tubular collar on a side of the control knob opposite to a side of the control knob housing the profiled seat, the tubular collar housing the threaded end of the control screw and forming with the threaded end a second annular chamber adapted to house a spring, one end of the spring resting on a bottom of said second annular chamber and another, opposite end of the spring resting on a head of a stop screw which is screwed in the upper threaded end of said control screw and which is housed in the tubular collar of said control knob, and
ii) the bottom of the first annular chamber is provided with two sliding circular segments diametrically opposite each other and projecting at a first height from said bottom, each of said sliding circular segments being followed by one of the two equally opposite positioning projections projecting at a second height from said bottom, the second height being greater than the first height, the two positioning projections being diametrically opposite from each other, wherein between a free end of each of two sliding circular segments and each of the two positioning projections a positioning seat is formed for respectively housing one of two opposite stop projections of the neck of the valve.

2. The gas safety valve according to claim 1, wherein sliding sides of said two stop projections are flat and coplanar.

3. The gas safety valve according to claim 1, wherein sliding sides of the said two stop projections are oblique with respect to the bottom of the first annular chamber and define a wedge configuration with decreasing inclination from the step end adjacent to said positioning seats housing said stop projections on the neck of the valve and the end adjacent to the associated positioning projection of the knob.

4. The gas safety valve according to claim 1, wherein said two sliding circular segments are configured to reduce the thickness up to the bottom of a section of an end portion which is adjacent to one of the two positioning projections of the control knob so as to create a respective second positioning seat for housing said stop projections of the valve in an opening position, wherein a preliminary lifting of the control knob begins a closing movement.

5. The gas safety valve according to claim 1, wherein an upper sliding side of said stop projections on the neck of the valve has flared or rounded end.

6. The gas safety valve according to claim 1, wherein the height of the tubular collar of the control knob incorporates a head of the stop screw.

7. The gas safety valve according to claim 1, wherein the control knob has a grasping portion shaped to facilitate the lifting the control knob for opening and possibly closing the valve.

8. The gas safety valve according to claim 2, wherein said two sliding circular segments are configured to reduce the thickness up to the bottom of a section of an end portion which is adjacent to one of the two positioning projections of the control knob so as to create a respective second positioning seat for housing said stop projections of the valve in an opening position, wherein a preliminary lifting of the control knob begins a closing movement.

9. The gas safety valve according to claim 3, wherein said two sliding circular segments are configured to reduce the thickness up to the bottom of the first annular chamber near the positioning projections of the control knob, so as to create a respective second positioning seat for between the end portion of the sliding circular segment that lies on the bottom of the first annular chamber and the positioning projection, said second positioning seat being configured housing said stop projections of the valve in an opening position.

10. A gas safety valve, comprising:
a valve body that includes i) a through conduit with an inlet located at a first conduit end, an outlet located at a second conduit end, and an intermediate chamber located between the inlet and the outlet, and ii) a neck located above the intermediate chamber with two opposing stop projections projecting upwards from an upper edge of the neck, upper sliding sides of the stop projections defining sliding sides;
a ball shutter rotatably and sealingly housed in the intermediate chamber;
a control screw rotatable and axially not displaceable in the neck of the valve body, the control screw having i) a threaded end located at a top end of the control screw, ii) a groove located at a lower end of the control screw, and iii) a profiled enlargement located between the threaded end and the groove; and
a control knob positioned on the control screw, the control knob further comprising
i) an outer annular chamber having a bottom surface, two opposing circular segments located above the bottom surface, the circular segments defining two coplanar sliding planes and, at a first end of each circular segment, a step with respect to the bottom surface, and at a second end of each circular segment, a positioning projection, and two opposing seats located on the bottom surface between an end surface of each of the steps and an end wall of an adjacent one of the positioning projections, and
ii) a collar forming a circular seat with a bottom surface, and a hole in the middle of the bottom surface for housing the threaded end of the control screw, the inner walls of the collar and the threaded end forming an inner annular chamber;
a stop screw screwed into the threaded end of the control screw, the stop screw having a head with a lower surface facing the bottom surface of the inner annular chamber; and
a spring housed in the inner annular chamber around the control screw bearing against the lower surface of the head of the stop screw and the bottom surface of the inner annular chamber,
wherein, in a closed state of the valve, a lower end of the stop screw extends through the hole of the bottom surface of the inner annular chamber so that the stop screw locks the control knob so that an opening motion on the control knob does not open the valve, unless the control knob is first lifted axially upwards.

11. A gas safety valve, comprising:
a valve body that includes i) a through conduit having an inlet and an outlet with an intermediate chamber located between the inlet and the outlet, and ii) a neck located above the intermediate chamber, the neck including two opposing stop projections projecting upwards from an upper edge of the neck, upper sliding sides of the stop projections defining sliding sides;
a ball shutter rotatably and sealingly housed in the intermediate chamber;
a control screw rotatable and axially not displaceable in the neck, the control screw having i) a top threaded end, ii) a lower end with a groove, and iii) a profiled enlargement located between the threaded end and the groove; and
a control knob, positioned on the control screw, and axially displaceable to open the valve, the control knob comprising
i) an outer annular chamber having
a bottom surface,
two opposing circular segments located above the bottom surface and defining two coplanar sliding planes with a step with respect to the bottom surface at a first end, and a positioning projection at a second end, and
two opposing seats located on the bottom surface between an end surface of each of the steps and an end wall of an adjacent one of the positioning projections, and
ii) a collar forming a circular seat with a bottom surface having a hole, the hole of the circular seat housing the threaded end of the control screw and defining an inner annular chamber with the threaded end;
a stop screw screwed into the threaded end of the control screw, the stop screw having a head with a lower surface facing the bottom surface of the inner annular chamber; and
a spring housed in the annular chamber around the control screw bearing against the lower surface of the head of the stop screw and the bottom surface of the inner annular chamber,
wherein, the valve is opened only by i) first lifting the control knob axially upwards so that the upper sliding sides of the stop projections are beneath two sliding planes of two circular segments, and ii) second making a 90° rotation of the control knob in a first opening direction delimited by inner abutment sides of the positioning projections, and iii) third releasing the control knob after the 90° opening rotation causes the stop projections to rest with the upper sliding sides thereof on two circular segments maintaining the control knob at a lifted position, with the spring compressed.

12. The valve of claim 11, wherein, the valve is closed by rotating the control knob in the second closing direction so that the stop projections slide on the upper sliding sides on two circular segments until, at the end of the 90° closing rotation, said stop projections are beneath two opposing seats where the spring pushes on said stop projections with an expansion action to automatic lower the control knob into a closed position thereof.

13. The valve of claim 11, wherein in making the 90° rotation of the knob in the first opening direction, rotation of the control knob in the second closing direction is hindered by the end walls of the positioning projections.

14. A gas safety valve, comprising:
a valve body having a through conduit with an inlet, an outlet, and an intermediate chamber located between said inlet and said outlet;
a ball shutter housed in the intermediate chamber, the ball shutter comprising a through hole and an upper seat;
a control screw comprising i) a lower end adapted to be housed in the upper seat of the ball shutter and ii) a threaded end, positioned at the upper end of the control screw, the threaded end including a profiled enlargement, the control screw being positioned rotatable and axially not displaceable in a neck of the valve body; and
a knob comprising a profiled seat surrounded by a first annular chamber, and a collar provided on a side of the knob opposite to the profiled seat,
wherein the profiled seat houses the profiled enlargement of the control screw and is provided with a through hole wherein the threaded end of the control screw is located, wherein the first annular chamber comprises a bottom on which are formed two diametrically opposite circular segments, each circular segment comprising a sliding plane that at a first end forms a step with respect to said bottom, each circular segment further comprising a respective stop projection projecting from the sliding plane at a second end of the sliding plane opposite to the step with the bottom of the annular chamber, the two circular segments being spaced by two seats adapted for housing two respective stop projections projecting from the neck of the valve body, wherein the collar houses a portion of the threaded end that is located in the through hole of the profiled seat, and wherein inner walls of the collar form with outer walls of the threaded end a second annular chamber, wherein a spring is housed in said second annular chamber, a first end of the spring resting on a bottom of said second annular chamber and a second oppositer end of the spring resting on head of a stop screw which is housed in the collar and is screwed in the upper threaded end of the control screw.

* * * * *